Jan. 12, 1971          G. L. HANSEN          3,554,675
HYDRAULIC ROTARY-PRESSURE DEVICE
Filed Dec. 20, 1968
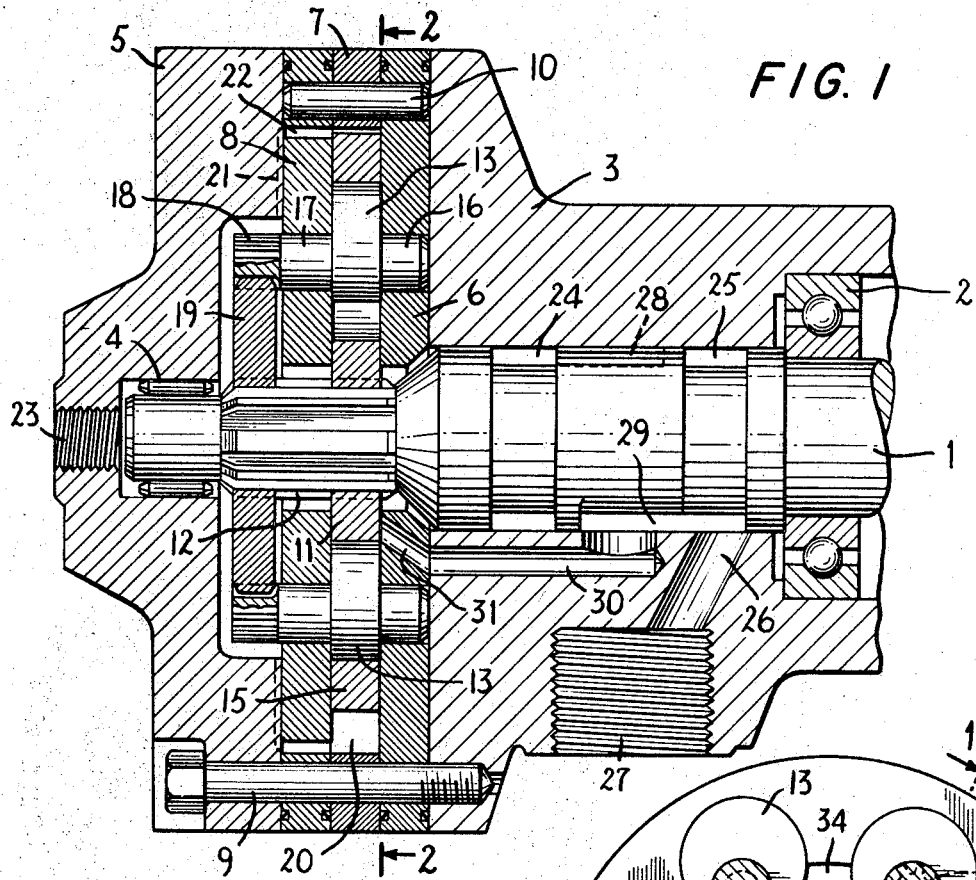
FIG. 1
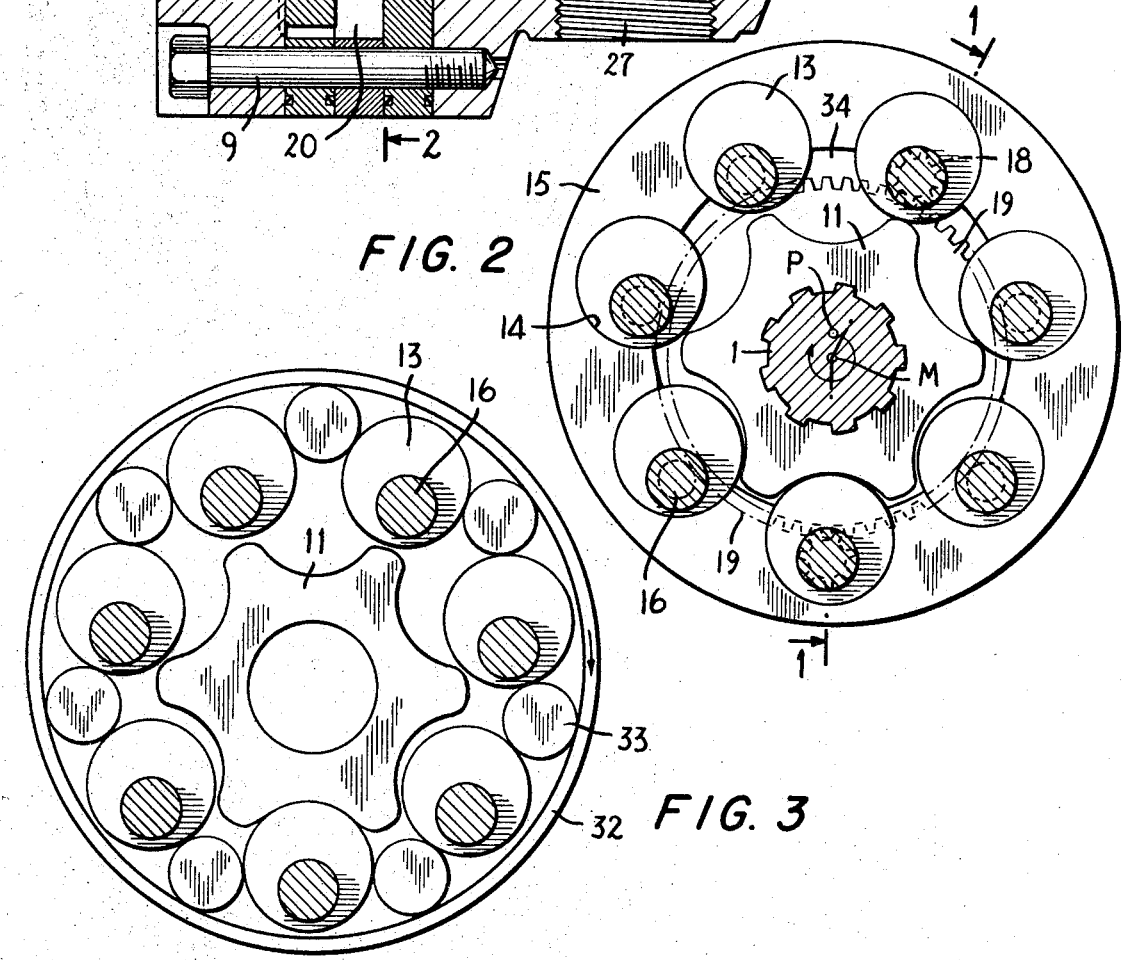
FIG. 2
FIG. 3

United States Patent Office 3,554,675
Patented Jan. 12, 1971

3,554,675
HYDRAULIC ROTARY-PRESSURE DEVICE
Gunnar Lyshoj Hansen, Nordborg, Denmark, assignor to Danfoss A/S, Nordborg, Denmark, a company of Denmark
Filed Dec. 20, 1968, Ser. No. 785,586
Claims priority, application Germany, Dec. 23, 1967, D 54,949
Int. Cl. F04c 1/02
U.S. Cl. 418—61                            6 Claims

ABSTRACT OF THE DISCLOSURE

A rotary fluid pressure device having a ring member defining an outer wall of a chamber within which are disposed a plurality of circularly arranged circular discs independent of the ring member defining internal "teeth" of the ring member and within the chamber is disposed a toothed star member about which orbital movement is effected so that the meshing teeth and discs define expanding and contracting cells within the chamber and a rotary valve arrangement driven in synchronism with the relative orbital movement of members places the cells sequentially in communication with inlet and outlet ports so that the device can function either as a pump or power motor which is reversible. The discs are pivotally mounted and rotationally driven from a main shaft of the device so that the relative orbital movement is effected by the discs imparting orbital movement to the ring member.

---

This invention relates generally to fluid pressure devices, and more particularly to gerotor gear sets or devices.

Gerotor gear sets are well known in the pump and motor art and, in general, comprise a pair of inner and outer gears with the inner member consisting of an externally toothed star gear or member having at least one less tooth than the outer internally toothed ring gear. The star gear is generally eccentrically mounted relative to the ring gear and there are various combinations wherein the axes of the gears may be fixed relative to each other or there may be relative orbital movement between the axes of the gears.

The rotary movement need be only a fraction of the speed of revolution of the associated displacement or orbital cycle. Difficulties arise in constructing these apparatus in that the toothed ring or the star member must be mounted so that the proper orbital closed path movement of the axis of rotation of the moving member is precise. This requires that the moving member be connected firmly to a shaft. It is known to use universal-joint shafts in these apparatus or guide devices with two directions of movement at right angles to each other for driving the orbital member.

In order to simplify the cutting or machining of the teeth in this type of apparatus it has been proposed to replace the teeth of the internally toothed gear by circular discs which are mounted in circular cut-away portions or recesses in the outer ring gear.

It is the principal object of the present invention to provide a fluid pressure device of the type described in which the construction is greatly simplified.

A feature of a fluid pressure device according to the invention is the provision of an outer ring having independent internal "teeth" cooperative with a rotationally moving star member in which the "teeth" of the internally toothed ring are eccentrically mounted circular discs. The discs are pivotally mounted on pivot pins disposed in a circular arrangement around the axis of the inner star member and eccentrically with respect to the centers of their individual discs. The eccentricity relative to the center of the circular discs is equal to the radii of the circular or closed path generated by the axis of rotation of the orbiting member which, in this case, in the outer ring, about the axis of rotation of the inner gear member.

The circular discs are rotationally driven in synchronism with the rotation of the toothed inner star member so that the effective orbital movement effected by the "teeth" or discs of the outer ring is in effect carried out independently of any directly imparted orbital movement of the outer ring itself and the desired orbital movement in effect is comparable to the orbital movement of the center of the outer ring if it itself were to move orbitally and rotationally.

The individual components can, therefore, be manufactured independently of each other with great precision and in a simple manner and easily assembled. In one embodiment, the circular discs are fitted in circular or arcuate cut-away portions of the outer ring. The construction can be simplified by the toothed outer ring being constructed exclusively from cylindrical or circular elements, in which case a simple cylindrical outer ring is manufactured and the circular discs are disposed within this ring and pivotally mounted and bear against the outer ring by cylindrical rollers each of which is disposed between two adjacent circular discs.

Other features and advantages of the fluid pressure apparatus in accordance with the present invention will be better understood as described in the following specification and dependent claims, in conjunction with the following drawings, in which:

FIG. 1 is a longitudinal section view of an apparatus, according to the invention, taken on section line I—I of FIG. 2;

FIG. 2 is a cross-section view taken on line II—II of FIG. 1; and

FIG. 3 is another cross-section view of another embodiment of apparatus according to the invention and taken similarly to that of FIG. 2.

The fluid pressure device according to the invention illustrated in the drawings comprises a main shaft 1 pivotally mounted on a ball bearing 2 in a first housing part 3 and a needle bearing 4 in a second housing part 5. A plate 6 is disposed between the two housing parts, as illustrated. A distance ring 7 spaces the two housings in conjunction with the first plate 7 and a second plate 8. These last three elements are held together by body bolts 9 connecting the housing sections 3, 5 and are additionally secured against rotation by pins 10.

An internally toothed or splined gear 11 is mounted on splines or teeth 12 on the main shaft 1 between the two plates 6, 8. This peripherally toothed gear 11 is constructed as a star member or element having six peripheral teeth or convexities as illustrated. Seven circular discs 13 are disposed ingularly spaced around the star member 11 and are mounted in circular or arcuate cut-away portions 14 in an outer ring 15. Each circular disc is pivotally mounted on a respective eccentrically mounted pivot pin 16 mounted in openings or holes 17 in the two plates 6, 8.

The centers of the holes 17, and therefore the axes of the pins 16, are disposed on a circle around the longitudinal axis M of the main shaft 1. These pivot pins have peripheral teeth or splines which mesh with teeth on a toothed disc or gear 19 internally toothed and mounted coaxial with the star member 11 on the splines of the shaft 1. When the shaft 1 rotates, the circular discs 13 are therefore rotationally driven in synchronism with the rotational movement of the star member 11 so that in effect a relative orbital movement of the outer ring member takes place and the center P of the outer ring 15 moves over, in effect, a circular closed path indicated by an arrow in FIG. 2.

As a consequence of the relative orbital movement, a space 20 defined between the outer ring 15 and the distance ring 7 increases and decreases. This change of dimension of the space 20 allows the formation of cells within the ring, as later explained to expand on one side of the line of eccentricity between the outer ring and the star element and contract on the other side of the line during relative movement between the cell-defining members, namely the outer ring and its discs and the star member. The expanding and contracting of these cells sequentially allows the device to function either as a pump or power motor. The apparatus is provided with radial passages 21 and axial passages 22 in the plate 8 communicating with the space 20 and a bore 23 in the housing through which fluid leakage into the space 20 can be drained out.

The shaft 1 is provided with two annular axially spaced recesses or grooves 24, 25 which communicate through passages 26 with each one of two ports 27 in the housing 3 which function as inlet and outlet ports. Axial passages 28, 29 extend alternately from the annular recesses 24, 25 and are placed in communication with expanding and contracting cells 34, by means of passages 30 in the housing 3 and bores 31 in the first plate 6. The expanding and contracting cells 34 are formed between the teeth of the star member 11 and the circular discs 13 of the outer ring 15. The number of passages 30, 31 corresponds to the number of circular discs and the number of axial recesses or grooves 28, 29 corresponds to twice the number of teeth on the star member 11.

The last described construction of passages and ports is that of a commutator valve in which commutator action of the elements is similar to that of a rotary slide valve in this type of apparatus. If fluid under pressure is applied to the apparatus through a port 27 the main shaft 1 will rotate and, conversely, the device will function as a pump and discharge fluid under pressure through a port 27 when power is applied to the main shaft as an input. It being understood that the unit is reversible as to the direction of rotation.

Another embodiment of apparatus according to the invention is illustrated in FIG. 3 in which elements constructed in the manner of those heretofore described are designated with the same reference numerals as the first-described embodiment. In this construction, the outer ring is a simple annulus 32. The star member 11 is mounted internally thereof as well as the circular discs 13 mounted on their respective pivots in the arrangement heretofore described. In this embodiment the discs are not received in arcuate recesses for moving the outer ring instead between each successive pair or adjacent circular discs 13 is disposed a cylindrical roller 33 through which the circular discs bear on the inner wall of the outer ring 32. These rollers have three points of contact with the adjacent discs and the outer ring so that the same effective "orbital movement" of the outer ring and its "teeth" relative to the star member 11 is effected, so that the apparatus functions as heretofore described.

Those skilled in the art will recognize that the apparatus according to the invention will result in more even wear of the "teeth" of the orbital member than was heretofore possible when "circular teeth" or discs are used that simply slide on the outer ring. Furthermore, it will be seen that the speed of the rotary driven discs or "teeth" is synchronized with the rotation of the star member so that the expanding and contracting cells formed will operate as above described. The eccentricity of the pivots relative to the centers of the respective discs is chosen to correspond to radii of the closed circular path of the outer ring center as it moves about the axis of the center shaft so the proper operation ensures.

While preferred embodiments of the invention have been shown and described, it will be understood that many modifications and changes can be made within the true spirit and scope of the invention.

What I claim and desire to secure by Letters Patent is:

1. In a fluid pressure device, a ring member having teeth disposed internally thereof and defining an outer wall of a chamber, a cooperating externally toothed star member having fewer teeth than the teeth internally of said ring member and disposed in said chamber, one of said members moving orbitally about the axis of the other of said members and one of said members having rotational movement about its own axis, the teeth internally of said ring member and said star member intermeshing in sealing engagement to form expanding cells on one side of the line of eccentricity between said members and contracting cells on the other side of said line during relative movement between said members, valve means driven rotationally in synchronism with movements of one of said members, means defining fluid inlet and outlet passages and ports in communication with said cells under control of said valve means to effect communication between said inlet port and the expanding cells and between said outlet port and said contracting cells, and the teeth of said internally toothed ring each comprising an eccentrically mounted disc independent of said ring member, pivots for the discs arranged circularly spaced and eccentrically to the centers of the respective discs, and the pivots of said discs being disposed concentrically with respect to the axis of rotation of said star member and eccentric with respect to the individual centers of their respective discs, radial distances of eccentricity corresponding to the radii of the closed path of travel of the center of said ring member during orbital movement thereof.

2. In a fluid pressure device according to claim 1, in which said ring comprises circularly arranged arcuate cut-away portions, and said discs being disposed in said arcuate cut-away portions.

3. In a fluid pressure device according to claim 1, in which said ring is disposed circumferentially of said discs, and cylindrical roller means between successive, adjacent discs, each of said cylindrical roller means contacting the adjacent discs and the inner wall of said ring.

4. In a fluid pressure device according to claim 1, including means for rotationally driving said discs synchronously.

5. In a fluid pressure device according to claim 4, in which said pivots comprise pivot pins each having peripheral teeth, a shaft in said device operatively connected to said star member and having means thereon having peripheral engaging teeth of said pins for joint rotation with said shaft.

6. In a fluid pressure device according to claim 5, in which means on said shaft having said peripheral teeth comprises a toothed gear, the toothed gear having a speed reduction factor corresponding to the number of teeth on said star member, whereby the discs are driven rotationally in synchronism with said star member.

References Cited

UNITED STATES PATENTS

| 448,609 | 3/1891 | Gollings | 103—132 |
| 1,700,038 | 1/1929 | Feuerheerd | 91—56 |
| 3,289,602 | 12/1966 | Hudgens | 103—126(A) |
| 3,452,680 | 7/1969 | White, Jr. | 103—126(A) |
| 3,460,481 | 8/1969 | White, Jr. | 103—126(A) |

MARK NEWMAN, Primary Examiner

W. J. GOODLIN, Assistant Examiner